F. R. DENNISON.
SPARE WHEEL FOR MOTOR CARS AND THE LIKE.
APPLICATION FILED MAY 13, 1908.
932,969.
Patented Aug. 31, 1909.
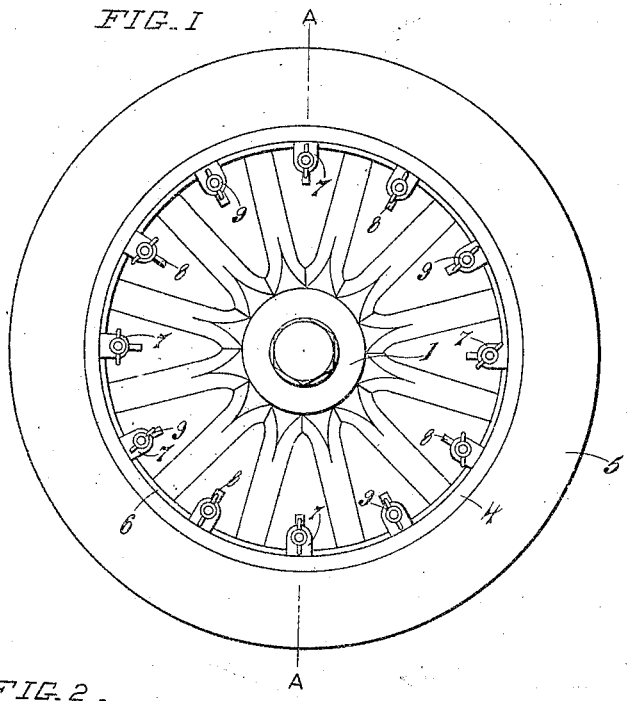
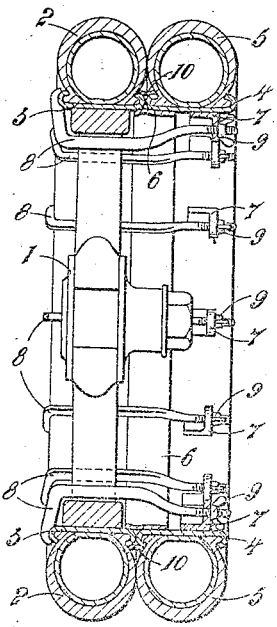
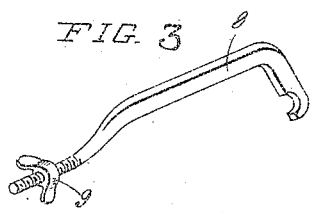
Inventor
Frederick Ridley Dennison

UNITED STATES PATENT OFFICE.

FREDERICK RIDLEY DENNISON, OF OAMARU, NEW ZEALAND.

SPARE WHEEL FOR MOTOR-CARS AND THE LIKE.

932,969.

Specification of Letters Patent.

Patented Aug. 31, 1909.

Application filed May 13, 1908. Serial No. 432,750.

*To all whom it may concern:*

Be it known that I, FREDERICK RIDLEY DENNISON, a subject of His Majesty the King of Great Britain and Ireland, residing at Oamaru, in the provincial district of Otago, in the Dominion of New Zealand, have invented a certain new and useful Improved Spare Wheel for Motor-Cars and the Like, of which the following is a specification.

This invention provides means for readily attaching a spare wheel rim and tire to the wheel of a motor car or the like, the tire of which has been punctured or otherwise so injured as to be unserviceable.

According to my invention a rim constructed to carry a pneumatic tire in the ordinary way is provided with a laterally projecting ring, adapted to pass into or outside the rim of the defective wheel, or two rings may be used one fitting inside and the other outside the rim, the edge of which thus lies in a groove. The spare rim, is attached to the wheel by any suitable connecting means, and preferably by hooked bolts engaging the spokes of the defective wheel and passing through ears or lugs integral with or secured to the rim of said spare rim.

The drawing herewith illustrates the invention as applied to the wheel of a motor car.

Figure 1, is a front elevation of a wheel complete. Fig. 2, a sectional elevation on line A—A, Fig. 1. Fig. 3, a perspective view of a hook bolt.

The wheel 1 is an ordinary motor car wheel and has the usual pneumatic tire 2 held in a rim 3. A wheel rim 4 has a pneumatic tire 5 and is provided with a laterally projecting ring 6, the projecting part of which is adapted to fit inside the rim 3 and tapers toward said rim, as shown in Fig. 2, so as to exert outwardly a wedge action thereon when said parts 6 and 3 are drawn together.

Lugs 7 secured to the rim are provided with hook bolts 8 adapted to fit upon the inner side of the rim 3 and to be tightened by thumb nuts 9. Such tightening causes said hooked bolts 8 to draw the extra rim 4 and tire 5 against the corresponding parts of the defective wheel and forces the projecting and tapering part of the ring 6 against and under the rim 3, wedging these parts tightly together and thus locking the extra rim 4 and tire 5 more securely in place. In the event of the tire being rendered unserviceable the rim 4 with its tire is attached to the wheel 1 by the hook bolts 8. The car can then be run upon the tire 5 until effective repairs can be undertaken. If desired a second ring 10 may be secured to the outer periphery of the rim 4, and project laterally therefrom. A groove is thus formed in which the rim 3 lies.

In the modification shown in Fig. 3 the ring 11 has a flange 12 in place of the lugs 7, and the hook bolts 13 pass through the flange. In this form of the invention the bolts engage the spokes 14 of the wheel 1 and the ring 11 lies against the felly 15 of the said wheel.

The spare wheel rim is carried on the vehicle with its tire fully inflated and is thus ready to be brought into service without delay. To place the spare wheel rim in position, the defective wheel is raised by means of a lifting jack, and the spare wheel which has been previously inflated is then secured to the defective wheel in the manner above described without interfering with the defective tire.

What I claim and desire to secure by Letters Patent of the United States is:—

1. A vehicle wheel having a rim which is accessible at its under side, in combination with an extra wheel having a tapering projecting ring adapted to fit under or within said rim and means for drawing said wheels together, thereby forcing said projecting part into wedge action against the said rim and thus securely clamping the two rims substantially as set forth.

2. A spare wheel having a ring attached thereto, which is provided with a laterally extending tapering part, in combination with a vehicle wheel having a rim adapted to receive said tapering part in contact therewith and bolts and nuts adapted to force the said ring into contact with said rim of the vehicle wheel for wedging said parts together, such bolts being passed through parts of the spare rim and engaging the rim of said vehicle wheel substantially as set forth.

In testimony whereof I have signed my name to this specification in the presence of two witnesses.

FREDERICK RIDLEY DENNISON.

Witnesses:
  EBENEZER PIPER,
  AUGUSTINE LUCAS.